United States Patent
Parla et al.

(10) Patent No.: US 12,519,775 B2
(45) Date of Patent: Jan. 6, 2026

(54) AUTHENTICATION (AUTHN) AND AUTHORIZATION (AUTHZ) BINDING FOR SECURE NETWORK ACCESS

(71) Applicant: Cisco Technology, Inc., San Jose, CA (US)

(72) Inventors: Vincent E. Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 17/902,201

(22) Filed: Sep. 2, 2022

(65) Prior Publication Data

US 2024/0080313 A1 Mar. 7, 2024

(51) Int. Cl.
*H04L 9/40* (2022.01)
(52) U.S. Cl.
CPC ........ H04L 63/083 (2013.01); H04L 63/0272 (2013.01); H04L 63/0281 (2013.01)
(58) Field of Classification Search
CPC ............. H04L 63/0281; H04L 12/4633; H04L 12/4641; H04L 2101/622; H04L 45/42; H04L 45/66; H04L 61/103; H04L 61/4511; H04L 63/0236; H04L 63/029; H04L 63/0435; H04L 67/02; H04L 67/101; H04L 67/1012; H04L 67/141; H04L 67/561; H04L 67/562; H04L 2209/76; H04L 2463/081; H04L 63/0272; H04L 63/0442;

(Continued)

(56) References Cited

U.S. PATENT DOCUMENTS 9,374,369 B2 *  6/2016  Mahaffey ............ G06F 21/6245
10,270,759 B1 *  4/2019  Bordelon .............. G06F 9/4843

(Continued)

FOREIGN PATENT DOCUMENTS

| CN | 113746882 A | 12/2021 |
| CN | 113918967 A | 1/2022 |
| WO | 2022121461 A1 | 6/2022 |

OTHER PUBLICATIONS

Kühlewind, Mirja, et al., "Evaluation of QUIC-based MASQUE proxying", in the Proceedings of the 2021 Workshop on Evolution, Performance and Interoperability of QUIC, Dec. 2021, pp. 29-34.

(Continued)

*Primary Examiner* — Greg C Bengzon
(74) *Attorney, Agent, or Firm* — Lee & Hayes, P.C.

(57) ABSTRACT

Techniques for combining independent sessions between application(s) and a VPN, proxy service, or similar system, including inner protocol sessions (e.g., such as QUIC, etc.), coming from a single device to form a single logical session, where the single logical session could share a single authentication/authorization token are described. The techniques include receiving, from a device within a network, a request for a first application to access a service associated with the proxy service or the VPN, sending, to the device, a first authentication request, and receiving, from the device, a message including a token. The techniques may further include authenticating, by the proxy service or the VPN, the token using a unique identifier associated with the device and enabling, by the proxy service or the VPN, the device to access the service via a first session flow.

16 Claims, 7 Drawing Sheets

(58) Field of Classification Search
CPC ............... H04L 63/062; H04L 63/0807; H04L 63/0815; H04L 63/083; H04L 67/10; H04L 67/14; H04L 9/3213
See application file for complete search history.

(56) References Cited

U.S. PATENT DOCUMENTS

| | | | | |
|---|---|---|---|---|
| 10,284,366 | B2* | 5/2019 | Striem-Amit | H04L 9/006 |
| 10,291,722 | B1* | 5/2019 | Mendez | H04L 63/20 |
| 10,728,044 | B1* | 7/2020 | Melo | H04L 9/0825 |
| 10,826,895 | B1* | 11/2020 | Krut | H04L 9/0894 |
| 10,958,662 | B1* | 3/2021 | Sole | H04L 63/0853 |
| 11,005,839 | B1* | 5/2021 | Shahidzadeh | H04W 12/06 |
| 11,134,058 | B1* | 9/2021 | Sole | H04L 63/10 |
| 11,245,706 | B2 | 2/2022 | Kuperman | |
| 11,381,600 | B1* | 7/2022 | Wang | H04L 63/168 |
| 11,743,256 | B1* | 8/2023 | Chen | H04L 63/08 726/6 |
| 11,924,299 | B2* | 3/2024 | Mestery | H04L 61/103 |
| 2011/0072144 | A1* | 3/2011 | Fikouras | H04L 67/56 709/230 |
| 2012/0239771 | A1* | 9/2012 | Rasanen | H04L 67/14 709/206 |
| 2014/0101236 | A1* | 4/2014 | Dietrich | H04L 67/148 709/203 |
| 2014/0189808 | A1* | 7/2014 | Mahaffey | G06F 21/6245 726/4 |
| 2015/0188949 | A1* | 7/2015 | Mahaffey | H04L 41/0894 726/1 |
| 2015/0200924 | A1* | 7/2015 | Parla | H04L 63/04 726/7 |
| 2016/0134599 | A1* | 5/2016 | Ross | H04L 63/0815 713/168 |
| 2016/0219060 | A1* | 7/2016 | Karunakaran | H04L 63/102 |
| 2016/0259936 | A1* | 9/2016 | Mukherjee | H04L 63/061 |
| 2016/0366221 | A1 | 12/2016 | Palmeri et al. | |
| 2017/0034152 | A1* | 2/2017 | Subramanya | H04L 63/101 |
| 2017/0118202 | A1* | 4/2017 | Mathew | G06F 21/445 |
| 2017/0118218 | A1* | 4/2017 | Koottayi | H04L 63/102 |
| 2017/0118223 | A1* | 4/2017 | Mathew | G06F 21/31 |
| 2017/0180351 | A1 | 6/2017 | Lu et al. | |
| 2018/0077143 | A1* | 3/2018 | Sridharan | H04L 63/0807 |
| 2018/0295137 | A1* | 10/2018 | Zager | H04L 63/0861 |
| 2019/0014102 | A1* | 1/2019 | Mathew | G06F 21/41 |
| 2019/0044705 | A1 | 2/2019 | Deval et al. | |
| 2019/0260733 | A1 | 8/2019 | Koranda et al. | |
| 2020/0120095 | A1* | 4/2020 | Senftleber | H04L 63/083 |
| 2020/0120167 | A1* | 4/2020 | Senftleber | H04L 67/10 |
| 2020/0145409 | A1* | 5/2020 | Pochuev | H04L 63/0853 |
| 2021/0112065 | A1* | 4/2021 | Yang | H04L 63/0884 |
| 2021/0367784 | A1* | 11/2021 | Gao | H04L 9/3236 |
| 2021/0392048 | A1* | 12/2021 | Olden | H04L 41/0816 |
| 2022/0166623 | A1* | 5/2022 | Alfonso Reyes | G06F 21/34 |
| 2022/0166780 | A1* | 5/2022 | Wang | H04L 63/0807 |
| 2022/0182372 | A1* | 6/2022 | Russo | G06F 16/958 |
| 2022/0255931 | A1* | 8/2022 | Avetisov | H04L 9/3263 |
| 2023/0074838 | A1* | 3/2023 | De Foy | H04L 63/0428 |
| 2023/0079444 | A1* | 3/2023 | Parla | H04L 67/562 726/11 |
| 2023/0081782 | A1* | 3/2023 | Parla | H04L 12/4633 709/238 |
| 2023/0083582 | A1* | 3/2023 | Parla | H04L 67/562 709/203 |
| 2023/0085513 | A1* | 3/2023 | Mestery | H04L 67/562 709/219 |
| 2023/0345246 | A1* | 10/2023 | Khare | H04W 12/069 |
| 2023/0370265 | A1 | 11/2023 | Ma | |
| 2023/0388786 | A1* | 11/2023 | Ihlar | H04L 63/0281 |

OTHER PUBLICATIONS

PCT Search Report and Written Opinion mailed Dec. 19, 2023 for PCT Application No. PCT/US2023/031850, 98 pages.

* cited by examiner

AUTHENTICATION (AUTHN) AND AUTHORIZATION (AUTHZ) BINDING FOR SECURE NETWORK ACCESS

TECHNICAL FIELD

The present disclosure relates generally to computer networking and more particularly to combining independent sessions with a proxy service, including inner protocol sessions (e.g., such as QUIC, etc), coming from a single device to form a single logical session, where the single logical session could share a single authentication/authorization token.

BACKGROUND

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using virtual private network (VPN) or proxy-based (ZTN) solutions.

While there may be additional methods for remote users to connect to private enterprise applications, traditionally, VPN tunneling and reverse proxy technologies are among the most common. However, both approaches come with limitations. While VPN tunneling can work with any application and protocol, it can also open up a large attack surface within the network. Additionally, while proxy-based solutions allow for better edge controls, which results in a smaller attack surface, they generally don't work well with protocols that are not transmission control protocol (TCP)-based, and require additional solutions to convert from a non-TCP protocol to a TCP protocol or to encapsulate the non-TCP protocol in TCP, which may impact performance of the proxies themselves, among other things.

Further, proxy nodes executing proxy solutions serve as a middle box into a connection (e.g., a TCP or UDP connection) and allow clients to connect to a public internet protocol (IP) address while the backend processing may be performed on nodes not connected to public IP addresses. Proxies typically achieve this by taking incoming connections, terminating them, and opening new connections on the backend. While these proxying techniques are traditionally performed on the TCP and (user datagram protocol) UDP protocols, these same proxying techniques may be performed on the QUIC protocol. However, since the QUIC protocol utilizes UDP as the underlying transport, it may be difficult to handle failover or replacement of a QUIC proxy node and provide the seamless user experience provided by typical TCP or UDP proxies. Moreover, the QUIC protocol was designed to not interoperate with version unaware middle boxes. Additionally, QUIC can migrate sessions in a manner in which only the endpoint and the QUIC server may be aware of such a change. Finally, the Multiplexed Application Substrate over QUIC Encryption MASQUE) protocol provides a mechanism for proxying different types of protocols (e.g., HTTP proxying, DNS over HTTPS, QUIC proxying, UDP proxying, and IP proxying) using a single proxy solution.

However, proxy protocols typically operate at the application/process layer. This means that each instance of an application, or different applications, from the same device will have a completely unique session with the proxy server. Accordingly, a user may be asked for authentication and/or authorization information each time an instance of an application or different application attempts to access the proxy server. Accordingly, it may be desirable to be able to bind disparate sessions together, coming from a common user on a common device at the server side so that it is possible to share a single Authentication/Authorization session across all disparate applications and proxy sessions from that same device and user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
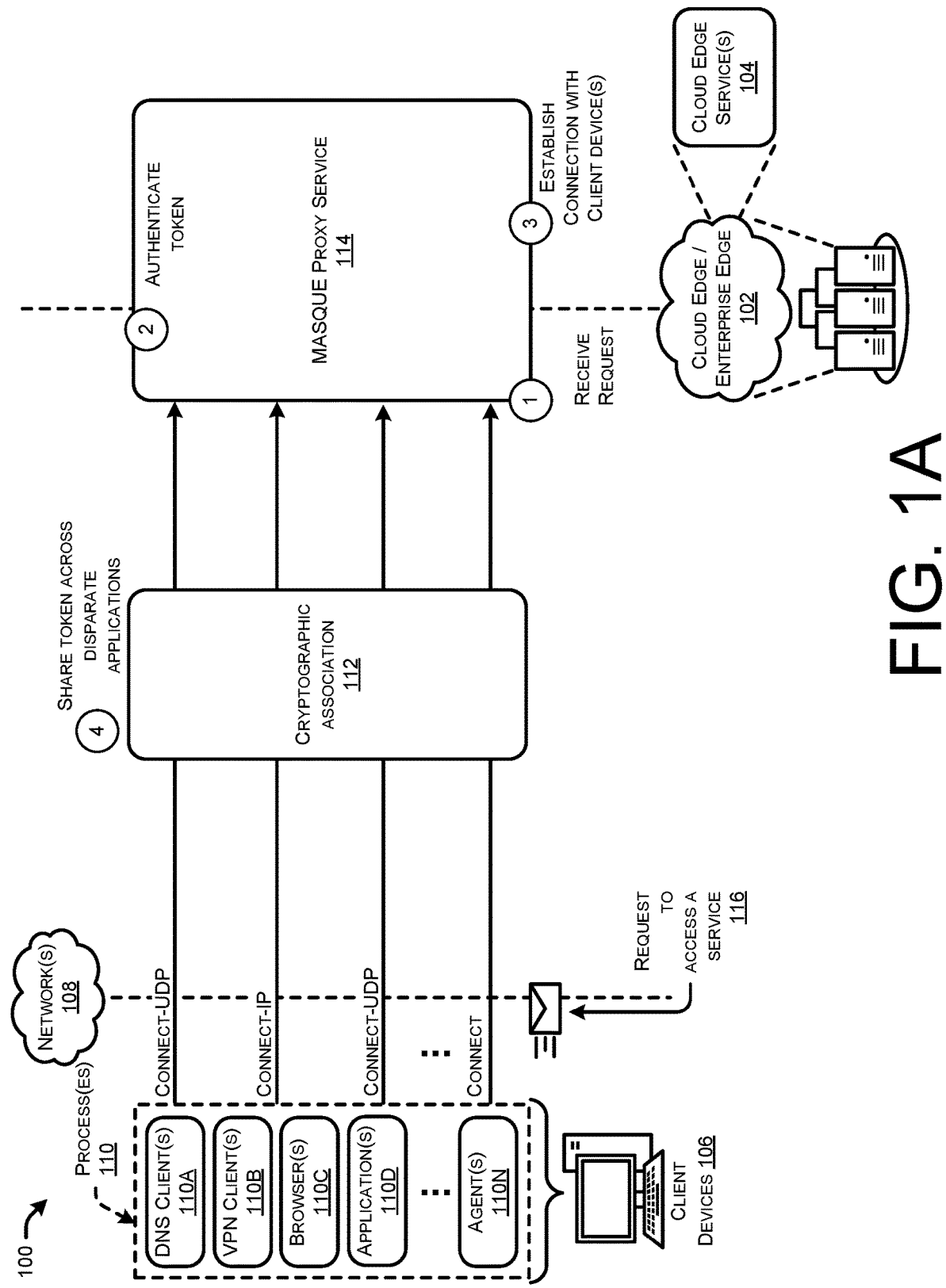
FIG. 1A illustrates a system-architecture diagram of an example environment for a proxy service to share a common authentication/authorization token across multiple MASQUE (and/or tunnel) proxy sessions from a single device.

This disclosure describes methods for combining independent sessions with a proxy service, including inner protocol sessions (e.g., such as QUIC, etc.), coming from a single device to form a single logical session, where the single logical session could share a single authentication/authorization token. The method includes receiving, from a device within a network, a request for a first application to access a service associated with the proxy service, sending, to the device, a first authentication request, and receiving, from the device, a message including a token. The techniques may further include authenticating, by the proxy service, the token using a unique identifier associated with the device and enabling, by the proxy service, the device to access the service via a first session flow.

Additionally, or alternatively, the method includes sending, from a device within a network, a request for an application to access a service associated with a proxy service, receiving, from the proxy service, an authentication request, generating, by the device, a token, wherein the token is signed using a unique identifier associated with the device, sending, to the proxy service, a message including the token, and establishing, with the proxy service and in response to the token being authenticated, a connection between the application and the service.

Additionally, the techniques described herein may be performed by a system and/or device having non-transitory computer-readable media storing computer-executable instructions that, when executed by one or more processors, performs the method described above.

EXAMPLE EMBODIMENTS

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using virtual private network (VPN) or proxy-based (ZTN) solutions.

While there may be additional methods for remote users to connect to private enterprise applications, traditionally, VPN tunneling and reverse proxy technologies are among the most common. However, both approaches come with limitations. While VPN tunneling can work with any application and protocol, it can also open up a large attack surface within the network. Additionally, while proxy-based solutions allow for better edge controls, which results in a smaller attack surface, they generally don't work well with protocols that are not transmission control protocol (TCP)-based, and require additional solutions to convert from a non-TCP protocol to a TCP protocol or to encapsulate the non-TCP protocol in TCP, which may impact performance of the proxies themselves, among other things.

Further, proxy nodes executing proxy solutions serve as a middle box into a connection (e.g., a TCP or UDP connection) and allow clients to connect to a public internet protocol (IP) address while the backend processing may be performed on nodes not connected to public IP addresses. Proxies typically achieve this by taking incoming connections, terminating them, and opening new connections on the backend. While these proxying techniques are traditionally performed on the TCP and (user datagram protocol) UDP protocols, these same proxying techniques may be performed on the QUIC protocol. However, since the QUIC protocol utilizes UDP as the underlying transport, it may be difficult to handle failover or replacement of a QUIC proxy node and provide the seamless user experience provided by typical TCP or UDP proxies. Moreover, the QUIC protocol was designed to not interoperate with version unaware middle boxes. Additionally, QUIC can migrate sessions in a manner in which only the endpoint and the QUIC server may be aware of such a change.

Finally, the Multiplexed Application Substrate over QUIC Encryption (MASQUE) protocol provides a mechanism for proxying different types of protocols (e.g., HTTP proxying, DNS over HTTPS, QUIC proxying, UDP proxying, and IP proxying) using a single proxy solution.

However, proxy protocols typically operate at the application/process layer. This means that each instance of an application from the same device will have a completely unique session with the proxy server. Accordingly, a user may be asked for authentication and/or authorization information each time an instance of an application attempts to access the proxy server. Accordingly, it may be desirable to be able to be able to bind disparate sessions together, coming from a common user on a common device at the server side so that it is possible to share a single Authentication/Authorization session across all disparate applications and proxy sessions from that same device and user.

This disclosure describes methods for combining independent sessions with a proxy service, including inner protocol sessions (e.g., such as QUIC, etc.), coming from a single device to form a single logical session, where the single logical session could share a single authentication/authorization token. In some examples, the techniques may include receiving, from a device within a network, a request for a first application to access a service associated with the proxy service, sending, to the device, a first authentication request, and receiving, from the device, a message including a token. The techniques may further include authenticating, by the proxy service, the token using a unique identifier associated with the device and enabling, by the proxy service, the device to access the service via a first session flow.

In some examples, the MASQUE proxy service may execute on a single proxy node hosted at an edge of a cloud network or at an edge of an enterprise/application network. Additionally, or alternatively, a first instance of the MASQUE proxy service may execute on a first proxy node hosted at an edge of a cloud network (e.g., an ingress proxy node) and a second instance of the MASQUE proxy service may execute on a second proxy node hosted at an edge of the enterprise/application network, and so forth. Additionally, or alternatively, one or more enforcement nodes of a metadata-aware network may be configured to utilize metadata encoded into a connection ID of a QUIC header and apply one or more policies to a QUIC connection session between a remote client device and a private enterprise/application resource executing on an application node hosted in an enterprise/application network.

While this disclosure is described with reference to the MASQUE proxy service and/or protocol, it is understood that any VPN, ZTN, proxy protocol, and/or http-based protocol may be utilized.

In some examples, the MASQUE proxy instance(s) and/or the QUIC proxy instance(s) may be configured to access a global key/value data store configured to store mappings between one or more QUIC connection sessions. Additionally, or alternatively, one or more Ethernet over MASQUE (EoMASQUE) tunnels may be configured to tunnel L2 ethernet frames and may be established between separate network devices hosted in separate network sites, such as, for example, a remote client router, an enterprise router, and/or an EoMASQUE proxy node.

A client device may transmit a request to establish a connection with a private enterprise/application resource hosted in a private enterprise/application network. In some examples, the client device may run various software programs that can transmit the request using various protocols. For instance, the client devices may be running applications, software agents, web browsers, VPN clients, DNS clients, and the like, that can communicate data using encrypted data flows using various protocols. In some examples, the request may be transmitted using any of the protocols that may be proxied via the MASQUE protocol (e.g., CONNECT-UDP, CONNECT-IP, QUIC or HTTP/3 as HTTP over UDP, DNS over HTTPS, or any other CONNECT method offered by the MASQUE protocol) and/or an Ethernet CONNECT method.

In some examples, the proxy service may determine that a session has ended (e.g., such as based on a time period expiring, location changing, etc.). For instance, a user may initially establish one or more sessions between application(s) and the proxy service from a first location. The user may move to a second location and establish a new connection between a new application and the proxy service. In this example, when the new application requests access to a service of the proxy service, the proxy service may send, to the device, a request for interactive authentication (e.g., user credentials, unique identifier, etc.).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 for implementing at least some of the various technologies disclosed herein. For instance, FIG. 1A may correspond to an environment 100 for sharing a common authentication/authorization token across multiple MASQUE (and/or tunnel) proxy sessions from a single device. As noted above, while FIG. 1A is described with reference to the MASQUE proxy service and/or protocol, it is understood that any VPN, ZTN, proxy protocol, and/or http-based protocol may be utilized.

The environment 100 includes one or more cloud network(s) having a cloud edge and/or enterprise edge 102, enterprise edge service(s) 104, a client device 106 that may utilize one or more resources of the enterprise/application network 104 via one or more networks 108, such as, for example the one or more cloud networks, by way of one or more process(es) 110. In some examples, the one or more process(es) may include DNS client(s) 110A, VPN client(s) 110B, browser(s) 110C, application(s) 110D, and/or software agent(s) 110N executing on the client device 106.

As illustrated, the MASQUE proxy service 114 may be hosted at a cloud network edge 102 providing one or more cloud edge service(s) 122, such as, for example SASE services that may be applied to a data stream between the client device and the MASQUE proxy service 114.

As illustrated in FIG. 1A, a common authentication/authorization token may be shared across multiple MASQU proxy sessions from a single device (illustrated as cryptographic association 112). For instance, the common token may be strongly bound to the device using technologies such as WebAuthN, FIDO, TPM, and/or OS protected client certificate private keys. Accordingly, a single authentication/authorization ceremony on any given device (per user) can be shared across disparate applications running on the same device.

At "1," the MASQUE proxy service 114 may receive a request to access a service 116 from the client device 106 and begin a proxy workflow. In some examples, the request 116 may comprise an HTTP request. In some examples, the HTTP request 124 may be transmitted by one or more process(es) 110 executing on the client device 106, such as, for example, a DNS client 110A, a VPN client 110B, a browser 110C, an application 110D, and/or a software agent 110N, leveraging one of the CONNECT methods offered by the MASQUE protocol, such as, for example, CONNECT-UDP and/or CONNECT-IP. Additionally, or alternatively, the MASQUE protocol may be extended to include a new entity configured to tunnel raw L2 ethernet packets via a tunneled connection 128 using a new CONNECT-ETH method.

As illustrated in FIG. 1A, the MASQUE proxy service 114 may receive request(s) from multiple disparate application(s). For instance, the request may correspond to a first request from an email application 110D on the client device 106.

At "2," the MASQUE proxy service 114 may perform an authentication/authorization ceremony associated with the request. For instance, the MASQUE proxy service 114 may authenticate a token included in the request. In some examples, the MASQUE proxy service 114 may authenticate the token using one or more cryptographic techniques (e.g., private/public key pairs, etc.) to determine that the request 116 is associated with a registered device. For instance, as described in FIG. 2 below, a device may register with the MASAQUE proxy service 114. The MASQUE proxy service 114 may store a unique identifier associated with the device, which may be used to authenticate the token.

At "3," the MASQUE proxy service 114 may, in response to authenticating the token, establish a connection with the application 110D on the client device 106. In some examples, authenticating the token may comprise performing one multi-factor authentication (MFA) Cycle (e.g., such as the Duo Dance), such that all of the process(es) on the client device 106 are authenticated.

At "4," the MASQUE proxy service 114 may receive additional request(s) from disparate applications on the client device. For instance, the MASQUE proxy service 114 may receive a second request may be received from a VPN client 110B. In this example, the MASQUE proxy service 114 may cryptographically associate 112 (e.g., bind) the first session associated with the application 110D and the second session associated with the VPN client 110B to form a single logical authentication/authorizations session.

In this way a single authentication ceremony to authenticate/authorize the proxy connection can also be used to authenticate each of application sessions with the proxy service, thus providing a better single sign on experience for a user by preventing the user from having to provide credentials for each application.

Figure 1B:
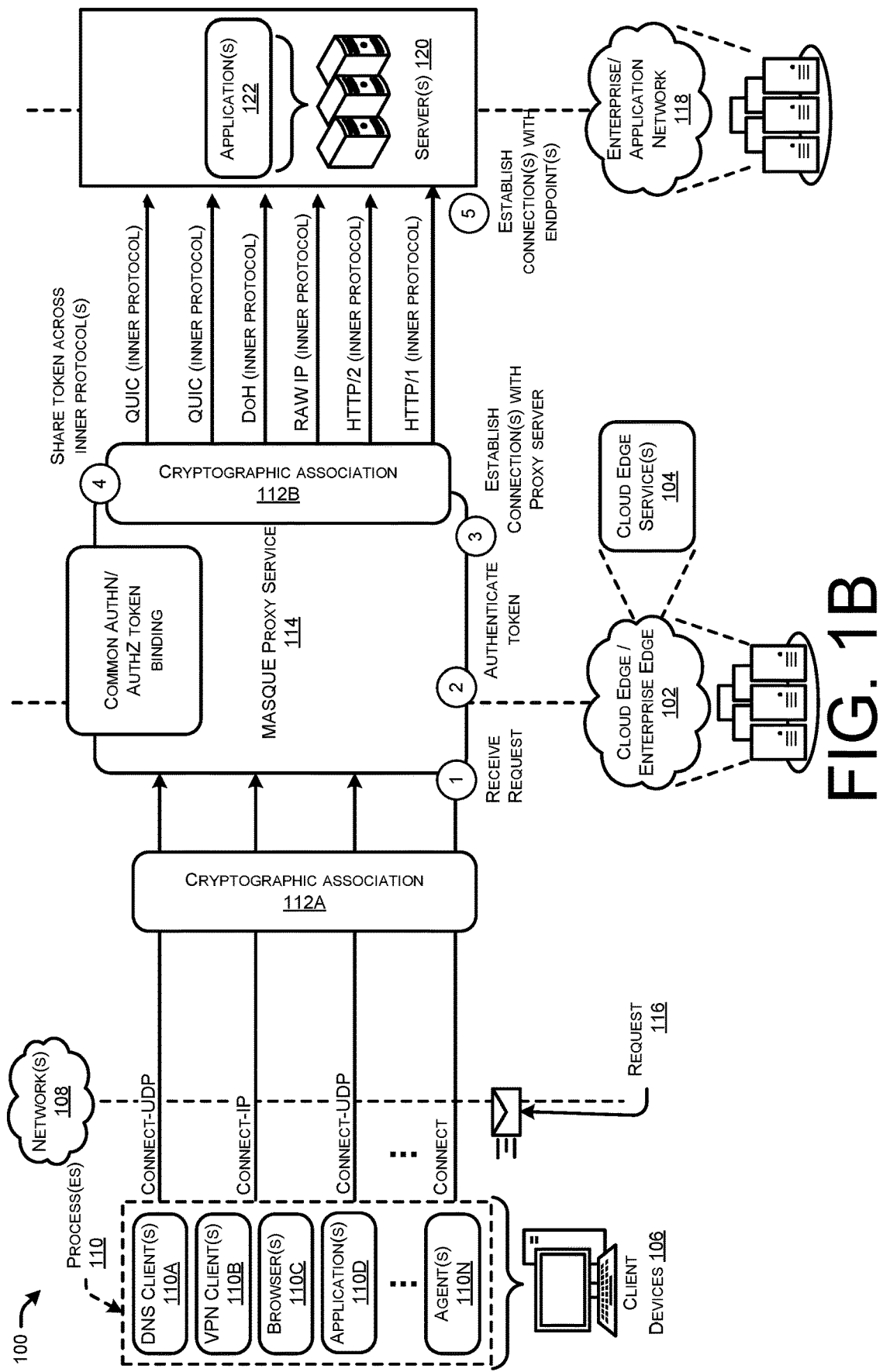
FIG. 1B illustrates a system-architecture diagram of another example environment for a proxy service to share a common authentication/authorization token with inner protocol layer(s) transported over a MASQUE proxy service (and/or tunnel).

FIG. 1B illustrates a system-architecture diagram of another example environment 100 for implementing at least some of the various technologies disclosed herein. For instance, FIG. 1B may correspond to an example environment 100 for sharing a common authentication/authorization token with inner protocol layer(s) transported over a MASQUE proxy service (and/or tunnel). As noted above, while FIG. 1B is described with reference to the MASQUE proxy service and/or protocol, it is understood that any VPN, ZTN, proxy protocol, and/or http-based protocol may be utilized.

As noted above, MASQUE provides a mechanism where different types of protocols can be proxied using a single proxy solution. This concept builds on the concepts of HTTP proxying functionality, which allowed the TCP protocol to be proxied using the HTTP CONNECT method. MASQUE has added additional mechanisms CONNECT-UDP to proxy UDP Packets and CONNECT-IP to proxy IP packets. Moreover, MASQUE provides the ability to proxy multiplexed protocols such as QUIC. In some examples, the MASQUE proxy is used a gateway or reverse proxy for private applications. Accordingly, in this example environment 100, an authentication with the MASQUE proxy service 114 provides an implicit authentication with all of the application entitlements the authenticated user is granted.

The environment 100 includes one or more cloud network(s) having a cloud edge 102A, an enterprise/application network 118, a client device 106 that may utilize one or more resources of the enterprise/application network 118 via one or more networks 108, such as, for example, the cloud network(s), by way of one or more process(es) 110, such as, for example, DNS client(s) 110A, VPN client(s) 1101B, browser(s) 110C, application(s) 110D, and/or software agent(s) 110N executing on the client device 106.

In some examples, the cloud network(s) and/or the enterprise/application network 118 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the cloud network(s) and/or enterprise/application network 118, such as, for example, the application(s) 122. In some examples, the physical server(s) may host any number of virtual machines. In some examples, the physical server(s) in the enterprise/application network 118 may host the various network components of the enterprise/application network, such as, for example, the applications 122.

Take, for example, an environment 100 including one or more networks 108. In some examples, the networks 108 may include a remote client network, a private enterprise/application network 118 having an enterprise/application edge 102, and/or a cloud network having a cloud edge 104. In some examples, the remote client network may include one or more client device(s), such as, a client device 106 (e.g., a desktop, laptop, or a mobile device) and/or a client router for connecting the client device to the additional networks, such as, the cloud network and/or the private enterprise/application network 104. In some examples, the cloud network may include one or more network nodes for establishing a connection session, one or more cloud edge services 122, such as, for example, one or more secure access service edge (SASE) services, and/or a first MASQUE proxy node executing a first MASQUE proxy service 114. In some examples, the private enterprise/application network 118 may include one or more network components, one or more servers 120 executing a private application resource 122, and/or a second MASQUE proxy node executing a second MASQUE proxy service, configured as an egress proxy node and hosted at an enterprise/application edge 102.

As illustrated in FIG. 1B, the MASQUE proxy service 114 may establish one or more inner protocols with application(s) 122 and/or end point device within the enterprise/application network 118. In some examples, the inner protocol(s) include QUIC, DoH, RAW IP, HTTP/2, HTTP/1, or any other suitable protocol. As noted above, the MASQUE proxy service 114 may be configured to perform binding on a common authentication/authorization token, such that an authentication/authorization token may be shared between the outer MASQUE protocol application layer and the inner application protocol(s).

At "1," the MASQUE proxy service 114 may receive a request to access a service 116 from the client device 106 and begin a proxy workflow. In some examples, the request 116 may comprise an HTTP request. In some examples, the HTTP request 124 may be transmitted by one or more process(es) 110 executing on the client device 106, such as, for example, a DNS client 110A, a VPN client 1101B, a browser 110C, an application 110D, and/or a software agent 110N, leveraging one of the CONNECT methods offered by the MASQUE protocol, such as, for example, CONNECT-UDP and/or CONNECT-IP. Additionally, or alternatively, the MASQUE protocol may be extended to include a new entity configured to tunnel raw L2 ethernet packets via a tunneled connection 128 using a new CONNECT-ETH method.

As illustrated in FIG. 1, the MASQUE proxy service 114 may receive request(s) from multiple disparate application(s). For instance, the request may correspond to a first request from an email application 110D on the client device 106.

At "2," the MASQUE proxy service 114 may perform an authentication/authorization ceremony associated with the request. For instance, the MASQUE proxy service 114 may authenticate a token included in the request. In some examples, the MASQUE proxy service 114 may authenticate the token using one or more cryptographic techniques (e.g., private/public key pairs, etc.) to determine that the request 116 is associated with a registered device. For instance, as described in FIG. 2 below, a device may register with the MASAQUE proxy service 114. The MASQUE proxy service 114 may store a unique identifier associated with the device, which may be used to authenticate the token.

At "3," the MASQUE proxy service 114 may, in response to authenticating the token, establish a connection with the application 110D on the client device 106. In some examples, authenticating the token may comprise performing one multi-factor authentication (MFA) Cycle (e.g., such as the Duo Dance), such that all of the process(es) on the client device 106 are authenticated.

At "4," the second MASQUE proxy service 114 may share the token across one or more inner protocol(s). For instance, the MASQUE proxy service 114 may inject a cookie into a header of an inner protocol session flow. As described in greater detail below, in some examples, the cookie corresponds to the token and prevents the process(es) 110 on the client device from being prompted for an interactive authentication request (e.g., such as an MFA cycle).

At "5," the MASQUE proxy service 114 may then establish a connection with the endpoint(s). For instance, the MASQUE proxy service 114 may utilize an IP address of the application 122 received in a DNS response to establish a tunneled connection 128B between the MASQUE proxy service 114 and the server(s) 120 hosting the application(s) 122 in the enterprise/application network 118, using one or more of the network components of the enterprise/application network 118. In some examples, the tunneled connection may be configured to transmit a data stream between the client device 106 and the application node 122.

In this way, a single authentication ceremony to authenticate/authorize the proxy connection can also be used to authenticate each of the inner application sessions, thus providing a better single sign on experience for a user.

Figure 2:
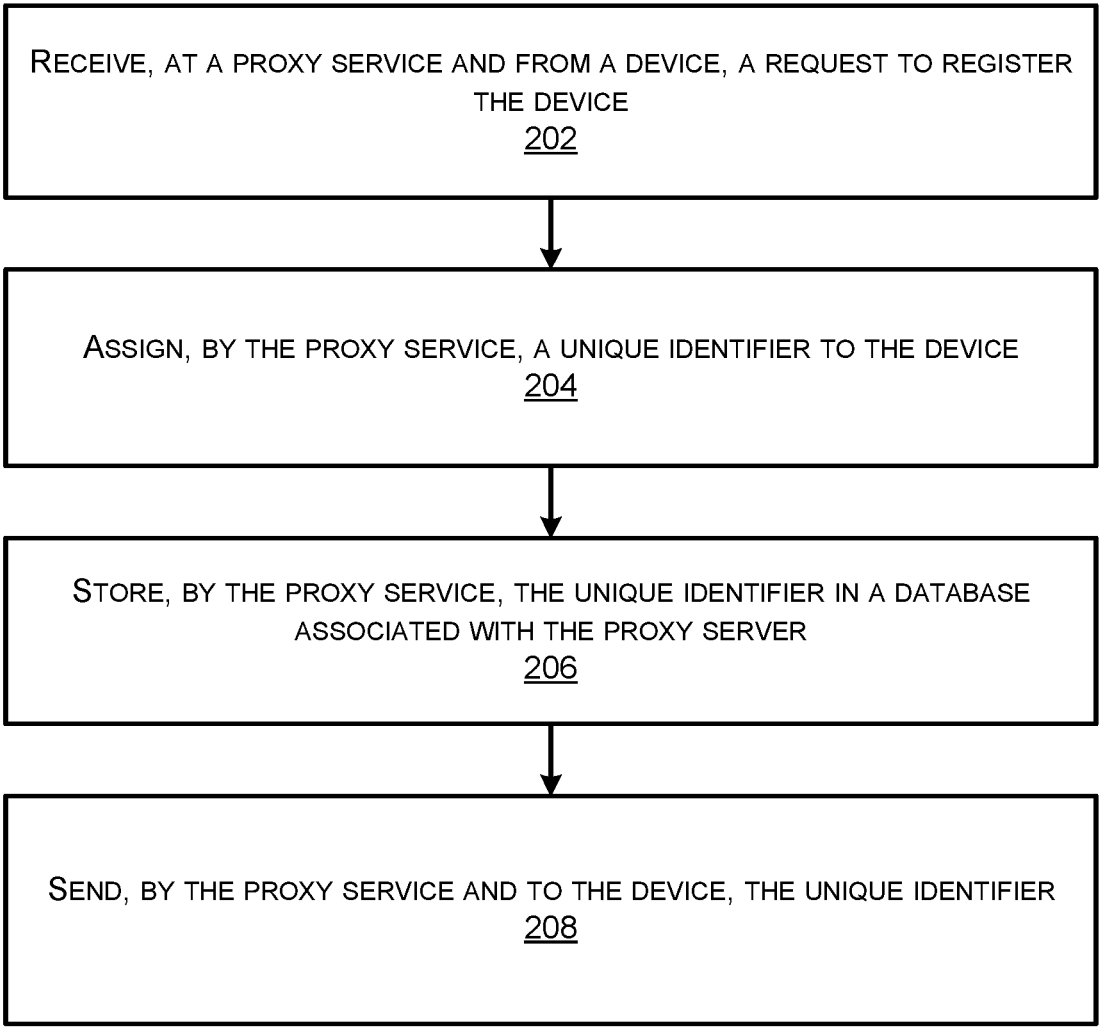
FIG. 2 illustrates a flow diagram of an example method for registering a client device with a proxy service.
Figure 3A:
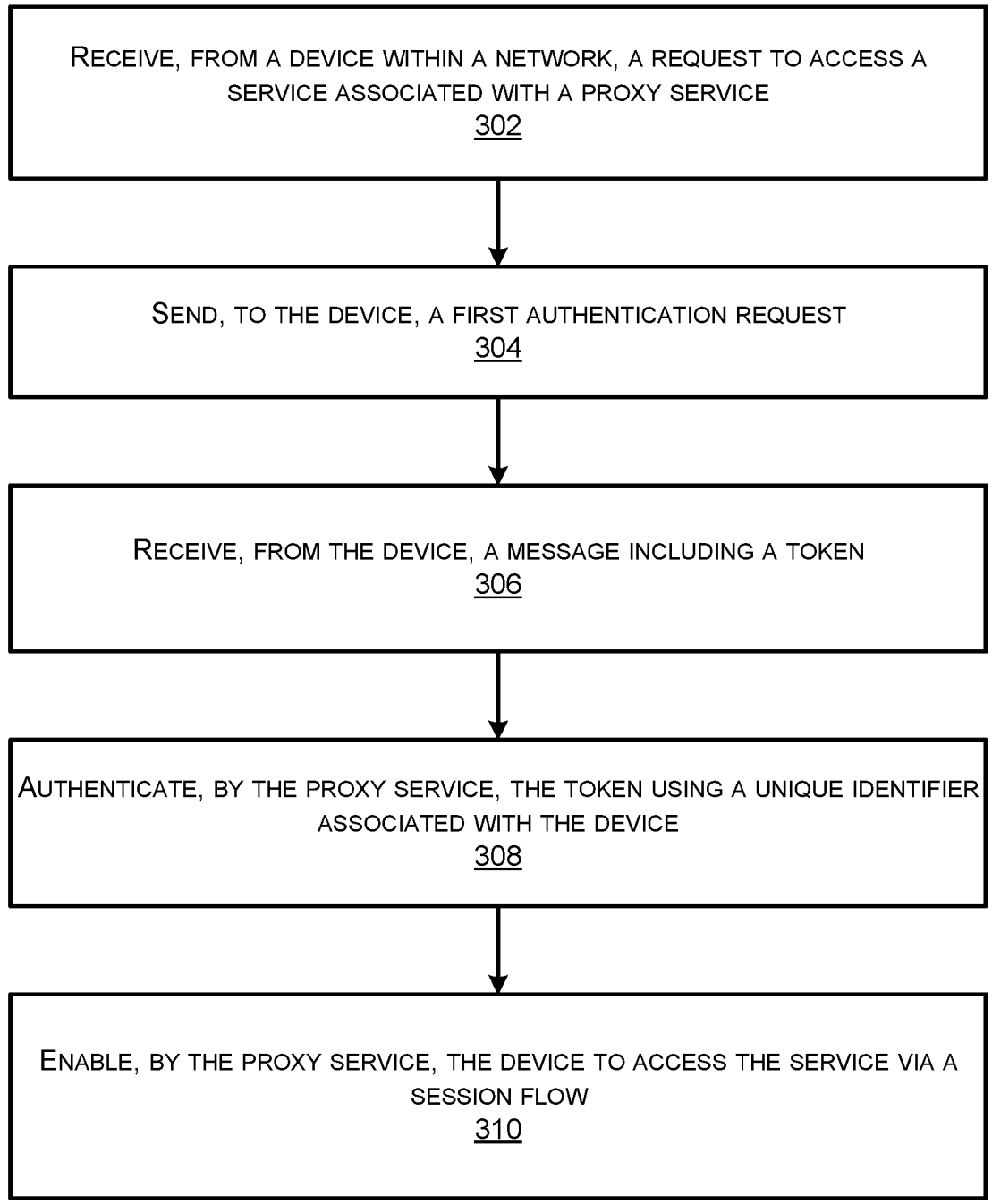
FIGS. 3A and 3B illustrate a flow diagram of an example method for combining independent sessions with a proxy service, including inner protocol sessions (e.g., such as QUIC, etc.), coming from a single device to form a single logical session, where the single logical session could share a single authentication/authorization token.
Figure 3B:
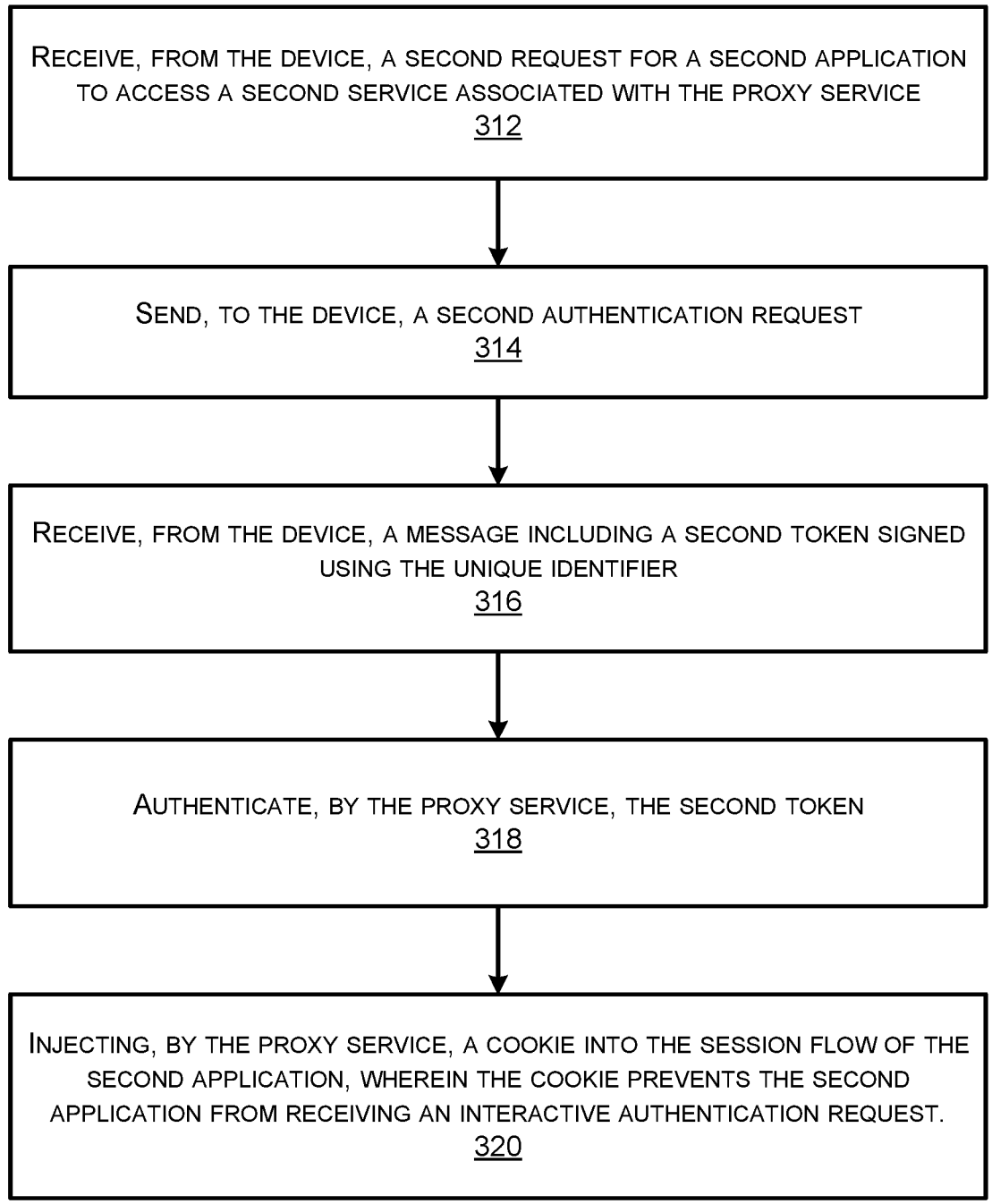
Figure 4:
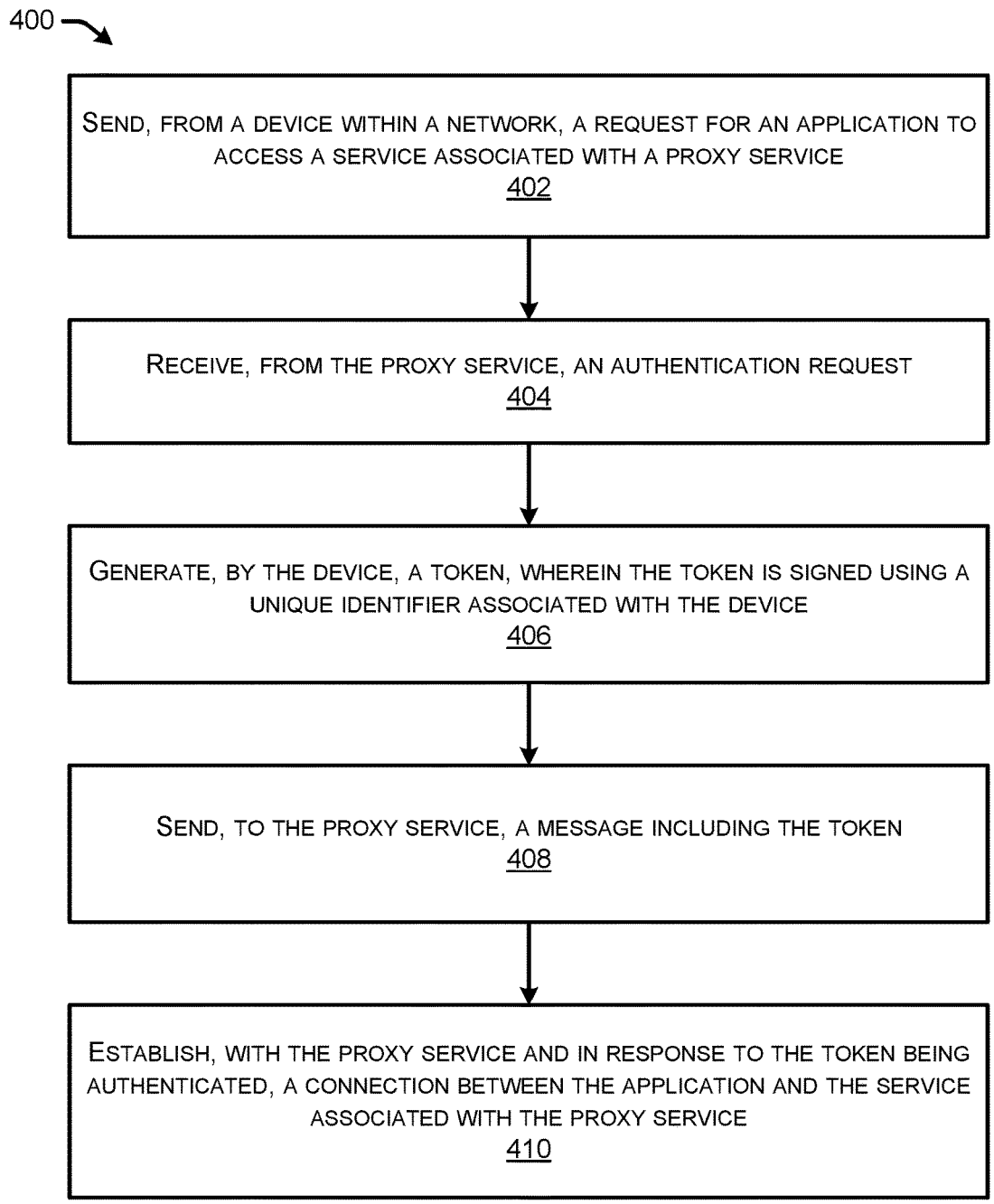
FIG. 4 illustrates a flow diagram of another example method for a client device to establish a connection between one or more applications and the proxy service.

FIGS. 2-4 illustrate flow diagrams of example methods 200-400 and that illustrate aspects of the functions performed at least partly by the cloud network(s), the enterprise network(s), the application network(s), and/or the metadata-aware network(s) and/or by the respective components within as described in FIGS. 1A and 1B. The logical operations described herein with respect to FIGS. 2-4 may be implemented (1) as a sequence of computer-implemented acts or program modules running on a computing system and/or (2) as interconnected machine logic circuits or circuit modules within the computing system. In some examples, the method(s) 200-400 may be performed by a system comprising one or more processors and one or more non-transitory computer-readable media storing computer-executable instructions that, when executed by the one or more processors, cause the one or more processors to perform the method(s) 200-400. As noted above, while FIGS. 2-4 are described with reference to a proxy service and/or protocol, it is understood that any VPN, ZTN, proxy protocol, and/or http-based protocol may be utilized.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2-4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method the method 200 for registering a client device 106 with a proxy service. For instance, the client device 106 may register with the MASQUE proxy service 114 described above. In some examples, the proxy service comprises a multiplexed application substrate over QUIC encryption (MASQUE) proxy service. In some examples, the MASQUE proxy service may execute on a first proxy node of one or more nodes, the first proxy node being deployed in an enterprise network associated with at least one of a DNS server or an application node.

At 202, the proxy service may receive, from a device, a request to register the device. For instance, the request may comprise an identifier (e.g., (e.g., PID, serial number, SUDI, or any other suitable information) of the device, a username associated with the user of the device, a password, etc. In some examples, a database associated with the proxy service may store the identifier of the device in association with a profile of the user.

At 204, the proxy service may assign a unique identifier to the device. For instance, in response to registering the device, the proxy service may assign the unique identifier. In some examples, the unique identifier may comprise a public key/private key pair, or any other suitable unique identifier.

At 206, the proxy service may store the unique identifier in the database associated with the proxy service. In some examples, the unique identifier may be associated with the profile of the user and/or device in the database.

At 208, the proxy service may send the unique identifier to the device. For instance, where the unique identifier comprises a private key/public key pair, the proxy service may send the public key to the device. In some examples, the proxy service may send the unique identifier in an encrypted message. In some examples, the encryption may be performed using an encryption protocol (e.g., SSL, TLS, DTLS, etc.).

FIGS. 3A and 3B illustrate flow diagrams of example method 300 for combining independent sessions with a proxy service, including inner protocol sessions (e.g., such as QUIC, etc.), coming from a single device to form a single logical session, where the single logical session could share a single authentication/authorization token.

At 302, the proxy service may receive, from a device within a network, a request to access a service associated with the proxy service. For instance, the device may be associated with a device that has registered with the proxy service as described above. As described above, the request may comprise a HTTP request. In some examples, the request may comprise an identifier of the device and/or a user associated with the device. In some examples, the request may be associated with a first application requesting access to a first service provided by the proxy service. In some examples, the request may trigger an authentication/authorization ceremony for the device.

At 304, the proxy service may send, to the device, a first authentication request. In some examples, the first authentication request may correspond to an interactive authentication request (e.g., an authentication request requiring user input). For instance, the first authentication request may correspond to an MFA cycle as noted above.

At 306, the proxy service may receive from the device, a message including a token. In some examples, the message may comprise input from the user, including a username, password, or some other identifier. In some examples, the token is generated by the first application for a first MASQUE session with the MASQUE proxy service. In some examples, the token is signed using the unique identifier provided to the device when the device registered with the proxy service. For instance, where the unique identifier comprises a private key/public key pair, the token may be signed using the public key. In some examples, the token is strongly bound to the device using technologies such as WebAuthN, FIDO, TPM, and/or OS protected client certificate private keys.

In some examples, any number of cryptographic algorithms and protocols can be used to generate tokens for each MASQUE session so long as the MASQUE proxy is able to apply a cryptographic function that can prove the tokens were all generated from the same device and/or a user of that device. The cryptographic algorithms may include HPKE, RSA, Privacy Tokens, or any number of other approaches.

At 308, the proxy service may authenticate the token using a unique identifier associated with the device. For instance, the proxy service may identify a private key associated with the device and use the private key to de-crypt the token and verify that the token is from the device registered with the proxy service. Accordingly, by authenticating the token, the proxy service is able to cryptographically verify that each independent MASQUE session is in fact the provenance of a single device and/or single user.

At 310, the proxy service may enable the device to access the service via a session flow. For instance, the proxy service may establish a first MASQUE session with the first application on the device in response to authenticating the token.

As described above, when multiple applications and/or process(es) establish sessions with the proxy service, each application may provide a token that utilizes the same unique identifier. Accordingly, the proxy service may cryptographically bind multiple applications accessing the proxy service via multiple MASQUE sessions using the shared token, such that a single authentication/authorization token may be utilized by the multiple disparate process(es).

As illustrated in FIG. 3B, at 312, the proxy service may receive, from the device, a second request for a second application to access a second service associated with the proxy service. As noted above, the request may comprise an HTTP request. In some examples, the request may comprise an identifier associated with device and/or a user of the device.

At 314, the proxy service may send, to the device, a second authentication request. In some examples, the second authentication request comprises a passive authentication request. For instance, the proxy service may identify the device using the identifier included in the request. In some examples, the proxy service may determine that the device has provided credentials as part of the interactive authentication request described above. In this example, the second authentication request comprises a request for the device and/or application to provide proof of possession of the unique identifier, such that a user is not required to provide input to re-authenticate the device.

At 316, the proxy service may receive from the device, a message including a second token signed using the unique identifier. In some examples, all tokens generated by the device have the cryptographic property that the proxy service will use to verify that all the tokens are generated by the same device and/or user profile. For instance, where the unique identifier comprises a public key/private key pair, the second token may be signed using the public key.

At 318, the proxy service may authenticate the second token. In some examples, the proxy service may authenticate that the second token is valid for a second session and then associate that second token with any other tokens (e.g., such as the first token) from the same device by performing a cryptographic function (e.g., cryptographic binding described above) that proves the association. Accordingly, since a root private key was used (either directly or via a key-derivation-function), all of the tokens generated from that common root private key can be associated on the server side as having been from a common source using standard cryptographic techniques.

At 320, the proxy service may inject a cookie into the session flow of the second application, wherein the cookie prevents the second application from receiving an interactive authentication request. For instance, the cryptographically related token will be inserted in the MASQUE header field for the second session with the MASQUE proxy service.

Accordingly, the techniques described herein provide a novel solution for combining independent MASQUE sessions, including inner protocol sessions (QUIC, etc), coming from a single device and/or a single user to form a single logical session, wherein the single logical session may share a single authentication/authorization token.

FIG. 4 illustrates flow diagrams of example method 400 for a client device to establish a connection between one or more applications and the proxy service.

At 402, the device may send to a proxy service, a request for an application to access a service associated with the proxy service. For instance, the device may register with the proxy service as described above.

At 404, the device may receive from the proxy service, an authentication request. As noted above, the authentication request may correspond to an interactive authentication request or a passive authentication request. For instance, if the application is the first application to access a service of the proxy service, the authentication request may comprise an interactive authentication request as described above. Where the application is a second, third, etc. application to establish a session with the proxy service, the authentication request may comprise a passive authentication request as described above.

At 406, the device may generate a token, wherein the token is signed using a unique identifier associated with the device. For instance, as noted above, the token may be strongly bound to the device. In some examples, the token may be generated using at least one of WebAuthN, FIDO, TPM, or OS protected client certificate private keys.

As noted above, where the application is a second application, third application, etc. establishing a session with the proxy service, the device may sign the token using the same public key and/or private key (e.g., unique identifier), such that each token from each disparate application can be bound to the same device. In some examples, such as where a key derivation function is used, a common private key may be used in the key derivation function. In this example, the use of a derived key in place of the original 'primary' key may maintain the same properties required to bind all of the independent sessions together at the server as having tokens from the same primary source (e.g., same device and/or same user).

At 408, the device may send, to the proxy service, a message including the token. For instance, as described above, the message may include user credentials (e.g., such as where the authentication request is an interactive authentication request). As noted above, the message may be encrypted. In some examples, the encryption may be performed using an encryption protocol (e.g., SSL, TLS, DTLS, etc.).

At 410, the device may establish, with the proxy service and in response to the token being authenticated, a connection between the application and the service associated with the proxy service. For instance, as noted above, the device may establish a MASQUE session flow with the MASQUE proxy service.

Figure 5:
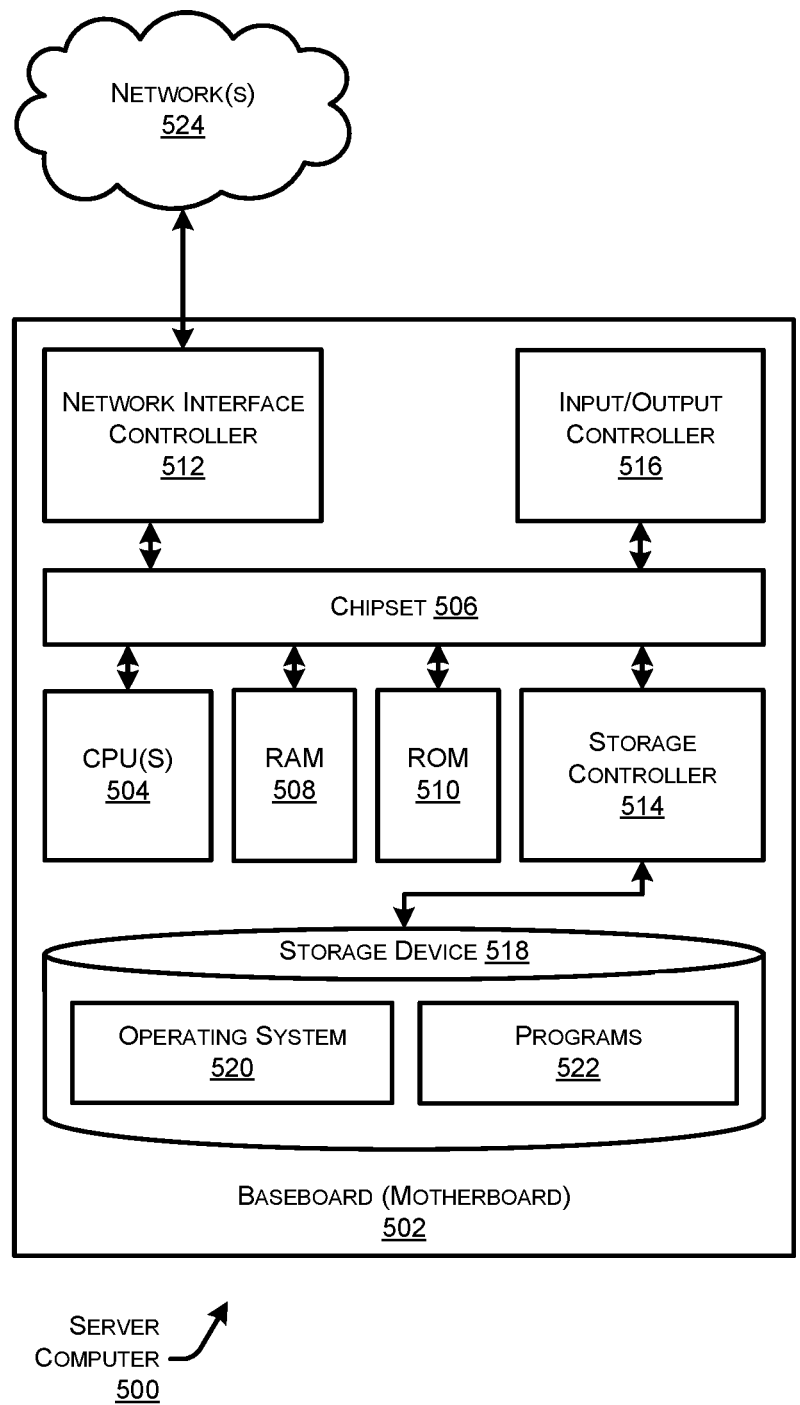
FIG. 5 is a computer architecture diagram showing an illustrative computer hardware architecture for implementing a server device that can be utilized to implement aspects of the various technologies presented herein.

FIG. 5 shows an example computer architecture for a computing device (or network routing device) 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The computing device 500 may, in some examples, correspond to a physical server associated with the cloud network(s), the enterprise network(s), the application network(s), and/or the metadata-aware network(s) as described in FIGS. 1A-4.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the network 524. The chipset 506 can include functionality for providing network connectivity through a NIC 512, such as a gigabit Ethernet adapter. The NIC 512 is capable of connecting the computing device 500 to other computing devices over the network 524. It should be appreciated that multiple NICs 512 can be present in the computing device 500, connecting the computer to other types of networks and remote computer systems.

The computing device 500 can be connected to a storage device 518 that provides non-volatile storage for the computing device 500. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the computing resource network 102, and or any components included therein, may be supported by one or more devices similar to computing device 500. Stated otherwise, some or all of the operations performed by the cloud network(s), the enterprise network(s), the application network(s), and/or the metadata-aware network(s), and/or any components included therein, as described in FIGS. 1A-4, may be performed by one or more computing device 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1A-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for sharing a common authentication and authorization token across multiple proxy session flows from a device, the method comprising:
    receiving, from the device within a network, a request for a first application to access a service associated with a proxy service via a first secure session flow, wherein the proxy service comprises a multiplexed application substrate over quick user datagram protocol internet connection (QUIC) encryption (MASQUE) proxy service;
    sending, to the device, a first authentication request;
    receiving, from the device, a message including a token, the token being signed using a unique identifier associated with the device, the unique identifier being shared across disparate applications on the device and assigned to the device by the proxy service at a time the device registers with the proxy service;
    authenticating, by the proxy service, the token using the unique identifier associated with the device, wherein authentication of the token causes the proxy service to bind the first secure session flow with subsequent independent secure session flows from the disparate applications on the device;
    enabling, by the proxy service, the device to access the service via the first secure session flow;
    receiving, from the device, a second request for a second application to access a second service via a second secure session flow, the second application comprising a non-browser application and the second secure session flow being independent of the first secure session flow; and
    based at least in part on receiving a second token signed using the unique identifier, authenticating, by the proxy service, the second token, wherein authenticating the second token causes the proxy service to bind the first secure session flow of the first application with the second secure session flow of the second application, wherein authenticating the second token further comprises:
        sending, to the device, a second authentication request;
        receiving, from the device, the second token signed using the unique identifier; and
        based on authenticating the second token, injecting, by the proxy service, a cookie into the second secure session flow of the second application, wherein the cookie prevents the second application from receiving an interactive authentication request that requests user input for authentication.

2. The method of claim 1, wherein the first authentication request comprises the interactive authentication request that requests the user input for authentication and the second authentication request comprises a passive authentication request that requests proof of possession of the unique identifier.

3. The method of claim 1, wherein the first secure session flow and the second secure session flow are included in a single logical session associated with the device, the single logical session being associated with the unique identifier.

4. The method of claim 1, wherein the unique identifier comprises a public key and a private key pair, and wherein the public key is sent to the device.

5. The method of claim 4, wherein the token is signed using the public key.

6. The method of claim 1, wherein the MASQUE proxy service is executing on a first proxy node of one or more nodes, the first proxy node being deployed in an enterprise network associated with at least one of a domain name system (DNS) server or an application node.

7. The method of claim 1, wherein prior to receiving the request to access the service, the method further comprises:
    receiving by the proxy service, a request to register the device within the network;
    assigning, by the proxy service, the unique identifier to the device;
    storing, by the proxy service, the unique identifier in a database associated with the proxy service; and
    sending, to the device, the unique identifier for use when generating the token.

8. The method of claim 1, wherein the first secure session flow and the second secure session flow are associated with a location, further comprising:

determining, by the proxy service and based on detecting a change in the location of the device, that one or more of the first secure session flow or the second secure session flow has ended;

receiving, from the device, a third request for one of the first application, the second application, or a third application, to access a service associated with the proxy service via a third secure session flow; and sending, to the device and based on the change in the location, a third authentication request comprising an interactive authentication request.

9. A system comprising:

one or more processors; and one or more non-transitory computer-readable media storing computer-executable instructions that, when executed by the one or more processors, cause the one or more processors to perform operations comprising:

receiving, from a device within a network, a request for a first application to access a service associated with a proxy service or a virtual private network (VPN) via a first secure session flow, wherein the proxy service comprises a multiplexed application substrate over quick user datagram protocol internet connection (QUIC) encryption (MASQUE) proxy service;

sending, to the device and based on determining the device is unauthenticated, a first authentication request that requests user input including credentials or a unique identifier assigned to the device for authentication of the device;

receiving, from the device, a message including a token, the token being signed using the unique identifier, the unique identifier being shared across disparate applications on the device for use in generating the token;

authenticating, by the proxy service or the VPN, the token using the unique identifier associated with the device, wherein authentication of the token causes the proxy service or the VPN to cryptographically associate the token with subsequent independent secure session flows from the disparate applications on the device, wherein at least one authentication request for a subsequent independent secure session flow is received from a non-browser application;

enabling, by the proxy service or the VPN, the device to access the service via the first secure session flow;

receiving, from the device, a second request for a second application to access a second service, the second application comprising the non-browser application;

sending, to the device, a second authentication request;

receiving, from the device, a second token signed using the unique identifier;

authenticating, by the proxy service or the VPN, the second token; and injecting, by the proxy service or the VPN, a cookie into a second secure session flow of the second application, wherein the cookie prevents the second application from receiving an interactive authentication request that requests the user input for authentication.

10. The system of claim 9, wherein the first authentication request comprises the interactive authentication request and the second authentication request comprises a passive authentication request that requests proof of possession of the unique identifier.

11. The system of claim 9, wherein the first secure session flow and the second secure session flow are included in a single logical session associated with the device, the single logical session being associated with the unique identifier.

12. The system of claim 9, wherein the unique identifier comprises a public key and a private key pair, and wherein the public key is sent to the device.

13. The system of claim 12, wherein the token is signed using the public key.

14. The system of claim 9, wherein the MASQUE proxy service is executing on a first proxy node of one or more nodes, the first proxy node being deployed in an enterprise network associated with at least one of a domain name system (DNS) server or an application node.

15. The system of claim 9, wherein prior to receiving the request to access the service, the operations further comprise:

receiving by the proxy service or the VPN, a request to register the device within the network;

assigning, by the proxy service or the VPN, the unique identifier to the device;

storing, by the proxy service or the VPN, the unique identifier in a database associated with the proxy service or the VPN; and sending, to the device, the unique identifier for use to generate the token.

16. A device comprising:

one or more processors; and one or more non-transitory computer-readable media storing computer-executable instructions that, when executed by the one or more processors, cause the one or more processors to perform operations comprising:

sending, from the device within a network, a first request for a first application to access a first service associated with a proxy service or a virtual private network (VPN), wherein the proxy service comprises a multiplexed application substrate over quick user datagram protocol internet connection (QUIC) encryption (MASQUE) proxy service;

receiving, from the proxy service or the VPN, a first authentication request, the first authentication request including a request for user input;

generating, by the device, a token, wherein the token is signed using a unique identifier associated with the device;

sending, to the proxy service or the VPN, a first message including the token;

establishing, with the proxy service or the VPN and in response to the token being authenticated, a first connection comprising a first secure session flow between the first application and the first service;

sending, from the device, a second request for a second application to access a second service associated with the proxy service or the VPN, the second application comprising a non-browser application;

receiving, from the proxy service or the VPN, a second authentication request for proof of possession of the unique identifier, the second authentication request omitting the request for user input;

sending, to the proxy service or the VPN, a second message including the token; and establishing, with the proxy service or the VPN and in response to the token being authenticated, a second connection comprising a second secure session flow between the second application and the second service, the first secure session flow and the second secure session flow corresponding to independent session flows.

\* \* \* \* \*